Nov. 28, 1933.  L. M. WOOLSON  1,936,702
PROPELLER
Filed Oct. 3, 1930
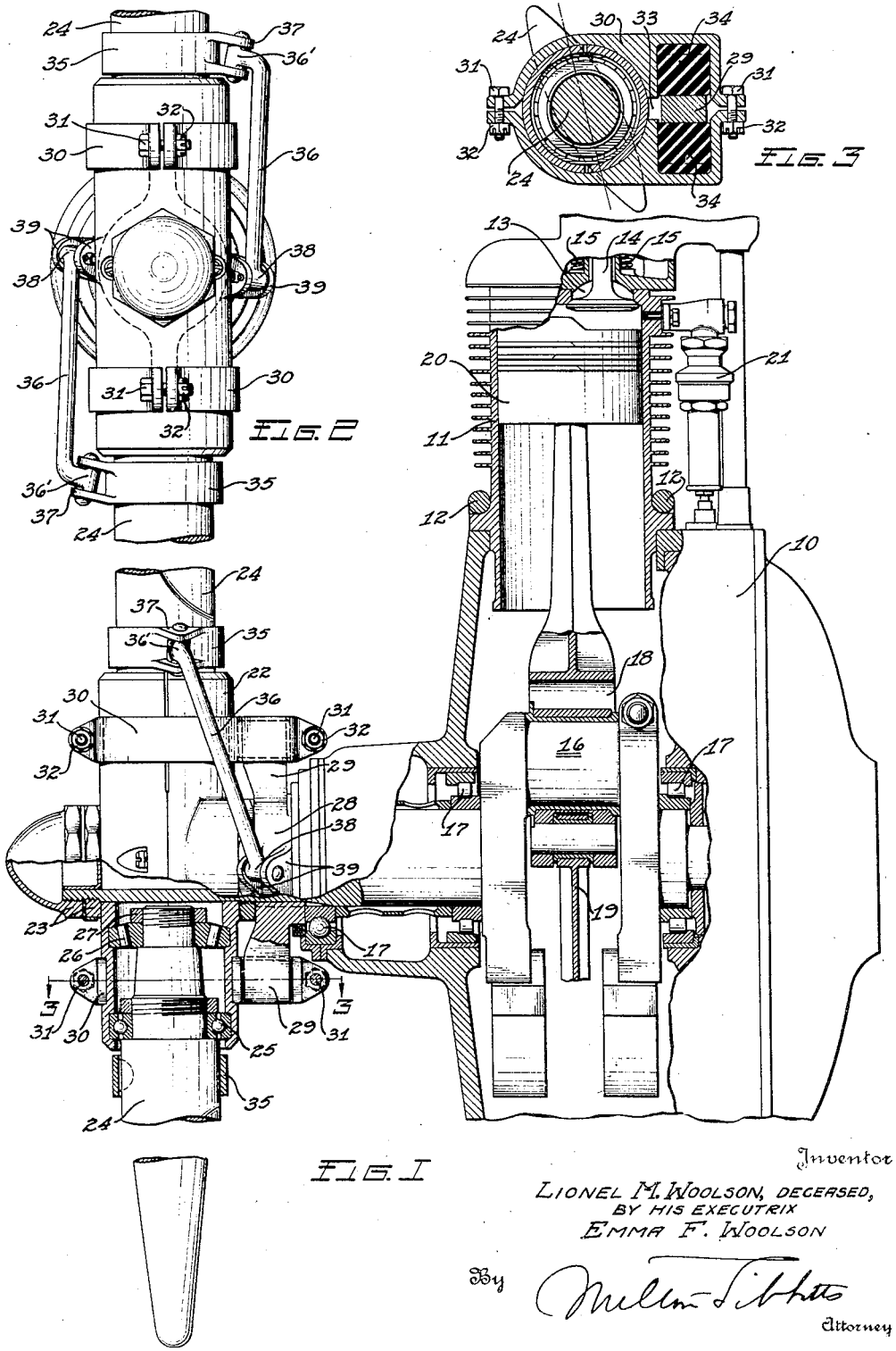
Inventor
LIONEL M. WOOLSON, DECEASED,
BY HIS EXECUTRIX
EMMA F. WOOLSON
By Million Tibbetts
Attorney Patented Nov. 28, 1933

1,936,702

UNITED STATES PATENT OFFICE 1,936,702

PROPELLER

Lionel M. Woolson, deceased, late of Detroit, Mich., by Emma F. Woolson, executrix, Bloomfield Village, Mich., assignor to Packard Motor Car Company, Detroit, Mich., a corporation of Michigan Application October 3, 1930. Serial No. 486,214

5 Claims. (Cl. 170—162)

This invention relates to power plants for airships and more particularly to mechanism for regulating the pitch of the propeller blades.

The horse-power developed by an airship engine is materially influenced by the propeller characteristics. When the propeller blade pitch is fixed, the maximum plant efficiency and engine horse-power development cannot be obtained for all flying conditions. For example, if the pitch of the propeller blades is such as to result in the greatest plant efficiency and engine horse-power development while cruising, then the efficiency is less than maximum, when the airship is climbing, and the horse-power is less than that which could be obtained with a different blade pitch. As maximum engine horse-power and plant efficiency are desired for all flying conditions, a propeller with a fixed pitch, will not answer the requirements.

An object of the present invention is to provide a power plant for airships in which the blade pitch is automatically regulated to produce maximum plant efficiency and engine horse-power under all flying conditions.

Another object of the present invention is to provide a power plant for airships in which the blade pitch is automatically regulated inversely to the torque to produce maximum power plant efficiency in all flying conditions.

A further object of the invention is to provide a power plant for airships in which a resilient drive between the propeller and the engine crank shaft is utilized to automatically regulate the pitch of the propeller blades and thus produce maximum efficiency of the plant in all flying conditions.

Other objects of the invention will appear from the following description taken in connection with drawing, which forms a part of this specification, and in which:

Fig. 1 is a side elevational view of a power plant for airships, partially broken away and partially in section to show working parts.

Fig. 2 is a fragmentary end view of the propeller.

Fig. 3 is a sectional view of the driving mechanism taken on line 3—3 of Fig. 1.

Referring now to the drawing by characters of reference, 10 indicates generally the crank case of an internal combustion engine of the Diesel, or compression-ignition type, suitable for use with airships.

The forward end of a crank shaft 16 projects through the crank case and supports the propeller structure. The propeller hub 22 is rotatably mounted upon the outer end of the crank shaft and is secured thereon axially by the nuts 23 which are screwed upon the end of the crank shaft. A pair of propeller blades 24 are rotatably mounted in the propeller hub and are carried by the ball bearing 25 and a roller bearing 26, axial displacement of the propeller blades being prevented by the means of the nuts 27 and the arrangement of the bearings in the hub.

Keyed to the crank shaft, intermediate the front bearing 17 and the propeller hub, is a yoke 28 having a pair of diametrically disposed arms 29 extending therefrom and preferably formed integral therewith. A two part bracket 30 is clamped around each end of the propeller hub by means of bolts 31 and nuts 32, and such brackets are formed to provide a chamber 33 into each of which an arm 29 of one of the driving yokes extend. Rubber blocks 34 are arranged within such chambers on both sides of each arm so that a resilient driving connection is provided between the crank shaft and the propeller hub.

In order to cause the propeller blade pitch to vary inversely with the torque, collars 35 are fixed to each of the blades and a link 36 is provided intermediate the yoke 28 and each of the collars 35. Each link is provided with a head 36' which is pivotally mounted in the ears 37 extending from the collars 35, while the opposite end of the links are formed with a head 38 which is pivotally carried by a pair of parallel ears 39 extending from the yoke.

Due to the resilient driving connection between the crank shaft and the propeller and the direct connection between the yoke and the rotatable propeller blades, the blade angle or pitch will change automatically with torque change. The links 36 are connected to the collars 35 fixed to the rotatably mounted blades, and changes in the driving position of the yoke arms relative to the propeller brackets will cause rotation of the blades through the change in position of the links. The links are arranged to move the blades so that their angle change is inversely to torque changes, that is when the engine power development is increased then the propeller pitch decreases and vice versa.

With the arrangement described, there will be less blade pitch when the airship is climbing than when cruising, and consequently less resistance is offered to the propeller rotation so that the engine will speed up, beyond what it would if the pitch had not changed, and thus envelops a higher horse-power. When cruising in level flight torque is less than when climbing and the propeller pitch is increased over that present when climbing. It will thus be seen that engine horsepower and efficiency of the entire power plant is obtained under the flying conditions mentioned.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to secure by Letters Patent is:

1. In a propeller mechanism, a shaft, a hub rotatably mounted on the shaft, angularly adjustable blades rotatably mounted in the hub, an elastic driving connection between the shaft and the propeller hub, and a link connector swivelled between each propeller blade and the shaft.

2. In a propeller mechanism, a shaft, a propeller hub rotatably mounted on the shaft, angularly adjustable blades rotatably mounted in the hub, an elastic driving connection between the shaft and the hub, and swivelled link members each comprising a rod connecting the propeller blades and the crank shaft.

3. In a propeller mechanism, a shaft, a propeller hub rotatably mounted on the shaft, blades rotatably mounted in the hub, driving elements integral with the hub and with the shaft, rubber blocks intermediate the driving elements on the hub and on the shaft, and link connectors pivotally connected at one end to the propeller blades and at the other end to the driving elements on the shaft.

4. In a propeller mechanism, a shaft, a propeller hub loosely mounted on the shaft, blades rotatably mounted in the hub, a driving yoke fixed to the shaft and resiliently associated in driving relation with the propeller hub, and mechanism comprising rods swivelled between the yoke and the blades, said mechanisms changing the blade pitch inversely to torque changes during rotation of the hub relative to the shaft.

5. In a propelling mechanism, a shaft, a propeller hub loosely mounted on the shaft, blades rotatably mounted on the hub, a driving member fixed on the shaft adjacent the hub, a flexible connection between the driving member and the hub, a collar fixed to each blade, and a rigid connector between each collar and the driving member, said connectors being pivotally attached to the collars at one end and pivotally attached to the driving member at their other end, rotation of said hub relative to the shaft shifting the pivotal point of the connector and the collars and rotating the blades in the hub to change the angle thereof.

EMMA F. WOOLSON,
*Executrix of the Estate of Lionel M. Woolson, deceased.*